(12) United States Patent
Moniz et al.

(10) Patent No.: US 8,091,334 B2
(45) Date of Patent: Jan. 10, 2012

(54) METHOD OF OPERATING A TURBOFAN ENGINE COWL ASSEMBLY

(75) Inventors: Thomas Ory Moniz, Loveland, OH (US); Jorge Francisco Seda, Cincinnati, OH (US); Robert Joseph Orlando, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/014,168

(22) Filed: Jan. 26, 2011

(65) Prior Publication Data

US 2011/0120136 A1     May 26, 2011

Related U.S. Application Data

(62) Division of application No. 11/559,747, filed on Nov. 14, 2006, now Pat. No. 7,886,518.

(51) Int. Cl.
    *F02K 1/08* (2006.01)
(52) U.S. Cl. ............... 60/204; 60/226.3; 60/771
(58) Field of Classification Search ........... 60/226.1, 60/232, 771, 226.3, 204; 239/265.19
    See application file for complete search history.

(56) References Cited

U.S. PATENT DOCUMENTS

| | | |
|---|---|---|
| 2,570,629 A | 10/1951 | Anxionnaz et al. |
| 2,938,335 A | 5/1960 | Cook, Jr. |
| 3,352,494 A | 11/1967 | Colville et al. |
| 3,829,020 A | 8/1974 | Stearns |
| 3,897,001 A | 7/1975 | Helmintoller, Jr. et al. |
| 4,043,508 A | 8/1977 | Speir et al. |
| 4,228,651 A | 10/1980 | Mullins |
| 4,793,134 A | 12/1988 | Coplin et al. |
| 5,261,227 A | 11/1993 | Giffin, III |
| 5,778,659 A | 7/1998 | Duesler |
| 5,806,302 A | 9/1998 | Cariola |
| 6,725,542 B1 | 4/2004 | Maguire |
| 6,983,588 B2 | 1/2006 | Lair |
| 7,886,518 B2 * | 2/2011 | Moniz et al. ............ 60/226.1 |

FOREIGN PATENT DOCUMENTS

| | | |
|---|---|---|
| GB | 1554921 | 10/1979 |
| GB | 2198999 A | 6/1988 |
| JP | 11159399 A | 6/1999 |
| WO | 9612881 A1 | 5/1996 |
| WO | 03060312 A1 | 7/2003 |
| WO | 2005085620 A1 | 9/2005 |

OTHER PUBLICATIONS

GB Search Report, Application No. GB0722371.2 (Feb. 22, 2008).

* cited by examiner

*Primary Examiner* — Ted Kim
(74) *Attorney, Agent, or Firm* — David J. Clement, Esq.; Armstrong Teasdale LLP

(57) ABSTRACT

An inner core cowl baffle assembly for a turbofan engine assembly is provided. The engine assembly includes a core gas turbine engine, a core cowl which circumscribes the core gas turbine engine, a nacelle positioned radially outward from the core cowl, and a fan nozzle duct defined between the core cowl and the nacelle. The inner core cowl baffle assembly includes an inner core cowl baffle, and an actuator assembly configured to vary the throat area of the fan nozzle duct by selectively repositioning the inner core cowl baffle with respect to the core cowl.

10 Claims, 3 Drawing Sheets

METHOD OF OPERATING A TURBOFAN ENGINE COWL ASSEMBLY

CROSS REFERENCE TO RELATED APPLICATIONS

This application is a divisional application of U.S. patent application Ser. No. 11/559,747, filed Nov. 14, 2006, now U.S. Pat. No. 7,886,518, which is hereby incorporated by reference in its entirety.

BACKGROUND OF THE INVENTION

This invention relates generally to turbofan engines, and more particularly to an inner core cowl baffle that may be utilized with a turbofan engine.

At least one known turbofan engine includes a fan assembly, a core gas turbine engine enclosed in an annular core cowl, and a fan nacelle that surrounds a portion of the core gas turbine engine. The fan nacelle is spaced radially outward from the annular core cowl such that the core cowl and fan nacelle form a fan nozzle duct having a discharge area (A18).

At least some known turbofan engines include a thrust reverser assembly. Known thrust reverser assemblies include a first fixed cowl and a second cowl that is axially translatable with respect to the first cowl. Generally, an actuator is coupled to the second cowl to reposition the second cowl with respect to the first cowl. As the second cowl is repositioned, airflow is discharged from the fan nozzle duct through the thrust reverser assembly. However, if the engine assembly does not include a thrust reverser assembly, the area of the fan nozzle duct becomes fixed and negatively affects the efficiency of the fan assembly.

BRIEF DESCRIPTION OF THE INVENTION

In one aspect, a method for operating a turbofan engine assembly including a core gas turbine engine, a fan assembly coupled to the core gas turbine engine, a core cowl which circumscribes the core gas turbine engine, a nacelle positioned radially outward from the core cowl, a fan nozzle duct defined between the core cowl and the nacelle, and a core cowl baffle positioned within the fan nozzle duct. The method includes varying an operating speed of the fan assembly from a first operating speed to a second operating speed, and selectively positioning the core cowl baffle between a first operational position and a second operational position to vary a throat area of the fan nozzle duct to facilitate improving engine efficiency at the second operating speed.

In a further aspect, an inner core cowl baffle assembly for a turbofan engine assembly is provided. The engine assembly includes a core gas turbine engine, a core cowl which circumscribes the core gas turbine engine, a nacelle positioned radially outward from the core cowl, and a fan nozzle duct defined between the core cowl and the nacelle. The inner core cowl baffle assembly includes an inner core cowl baffle, and an actuator assembly configured to vary the throat area of the fan nozzle duct by selectively repositioning the inner core cowl baffle with respect to the core cowl.

In a further aspect, a turbofan engine assembly is provided. The turbofan engine assembly includes a core gas turbine engine, a core cowl which circumscribes the core gas turbine engine, a nacelle positioned radially outward from the core cowl, a fan nozzle duct defined between the core cowl and the nacelle, and a core cowl baffle assembly positioned within the fan nozzle duct. The core cowl baffle assembly includes an inner core cowl baffle, and an actuator assembly configured to vary the throat area of the fan nozzle duct by selectively repositioning the inner core cowl baffle with respect to the core cowl.

DETAILED DESCRIPTION OF THE INVENTION

Figure 1:
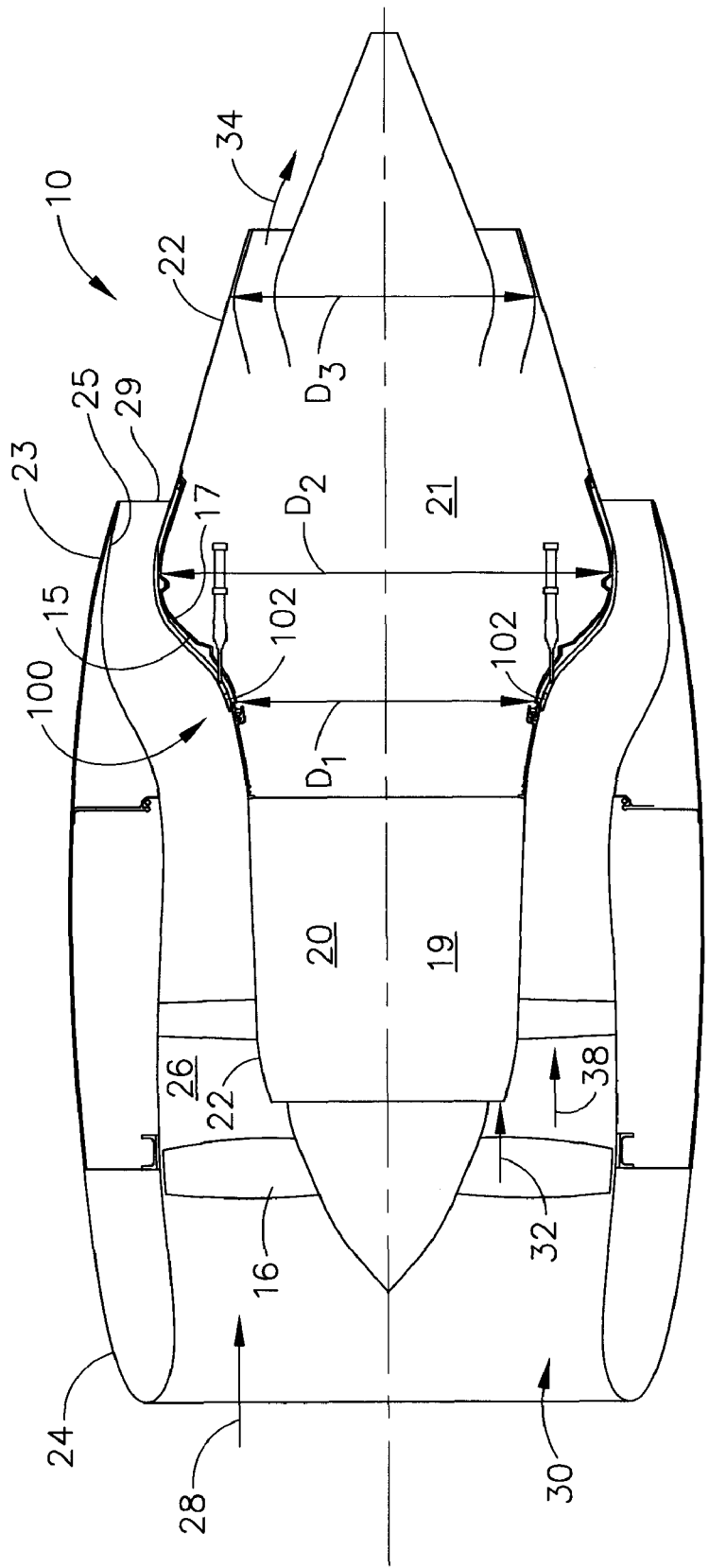
FIG. 1 is a cross-sectional view of an exemplary turbofan engine assembly that includes an exemplary inner core cowl baffle assembly.

FIG. 1 is a cross-sectional view of exemplary turbofan engine assembly 10 that includes an inner core cowl baffle assembly 100. In the exemplary embodiment, turbofan engine assembly 10 includes a core gas turbine engine 20 that includes a high-pressure compressor, a combustor, and a high-pressure turbine (all not shown). Turbofan engine assembly 10 also includes a low-pressure turbine (not shown) that is disposed axially downstream from core gas turbine engine 20, and a fan assembly 16 that is disposed axially upstream from core gas turbine engine 20. In the exemplary embodiment, turbofan engine assembly 10 includes an annular core cowl 22 that extends around core gas turbine engine 20 and includes a radially outer surface 15 and a radially inner surface 17. In the exemplary embodiment, core cowl 22 includes a first portion 19 that surrounds the high-pressure compressor and the combustor, and a second portion 21 that surrounds the high-pressure turbine and the low-pressure turbine. Second portion 21 is coupled to and positioned downstream from first portion 19. Turbofan engine assembly 10 also includes an inlet 30, a first outlet 29, and a second outlet 34.

Turbofan engine assembly 10 further includes a fan nacelle 24 that surrounds fan assembly 16 and is spaced radially outward from core cowl 22. Nacelle 24 includes a radially outer surface 23 and a radially inner surface 25. A fan nozzle duct 26 is defined between radially outer surface 15 of core cowl 22 and radially inner surface 25 of nacelle 24.

In the exemplary embodiment, turbofan engine assembly 10 includes a translating inner core cowl baffle 102 that will be discussed in more detail below.

During operation, airflow 28 enters inlet 30, flows through fan assembly 16, and is discharged downstream. A first portion 32 of airflow 28 is channeled through core gas turbine engine 20, compressed, mixed with fuel, and ignited for generating combustion gases which are discharged from core gas turbine engine 20 through second outlet 34. A second portion 38 of airflow 28 is channeled downstream through fan nozzle duct 26 which is discharged from fan nozzle duct 26 through first outlet 29.

Figure 2:
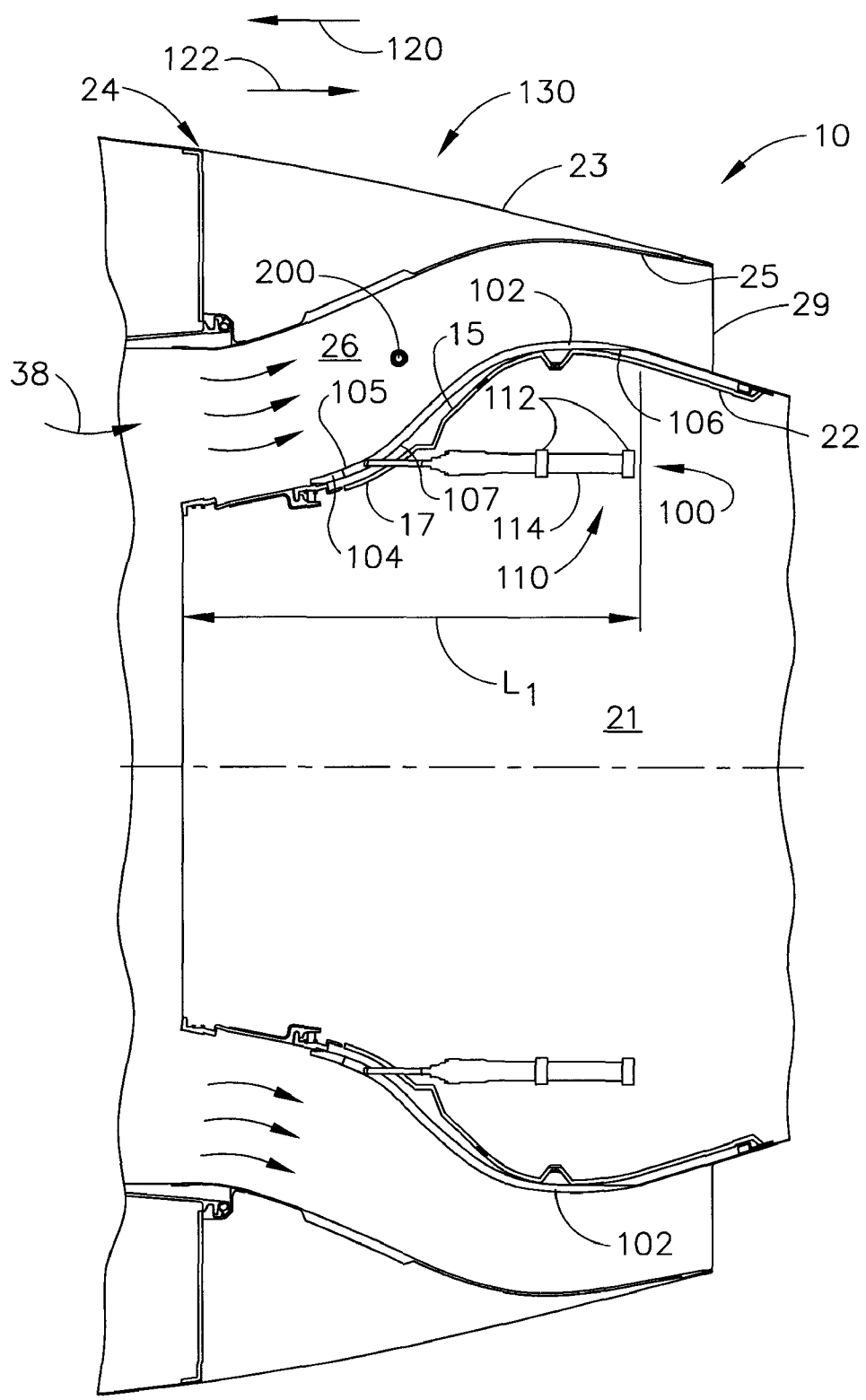
FIG. 2 is a partly sectional side view of the inner core cowl baffle assembly shown in FIG. 1 in a first operational position.
Figure 3:
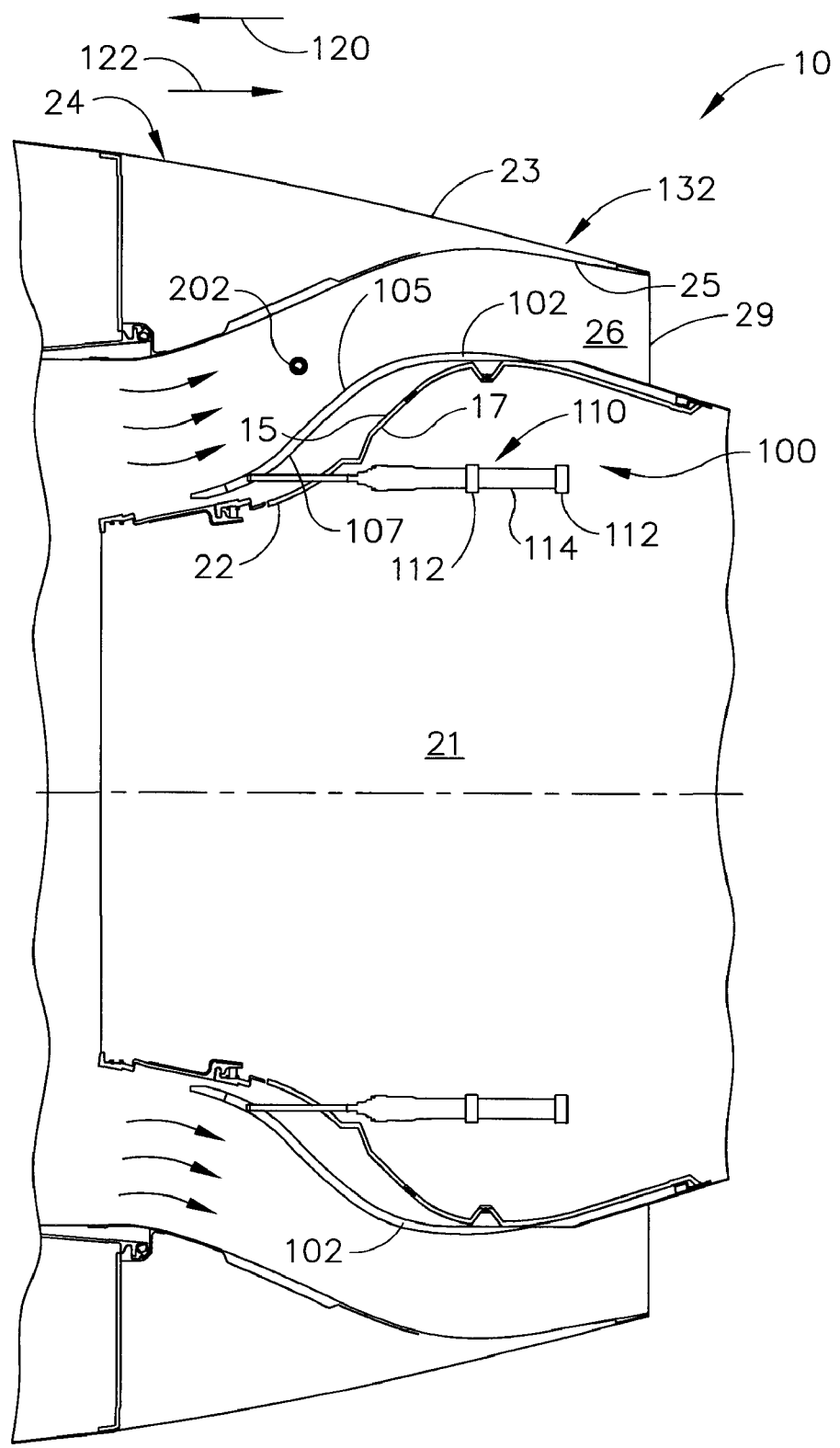
FIG. 3 is a partly sectional side view of the inner core cowl baffle assembly shown in FIG. 1 in a second operational position.

FIG. 2 is a partly sectional side view of the inner core cowl baffle assembly 100 in a first operational position 130. FIG. 3 is a partly sectional side view of the inner core cowl baffle assembly 100 in a second operational position 132.

In the exemplary embodiment, inner core cowl baffle assembly 100 includes translating inner core cowl baffle 102 which is coupled to core cowl 22 and is positioned along radially outer surface 15 of core cowl 22. In an alternative embodiment, turbofan engine assembly 10 includes a translating outer core cowl baffle (not shown) positioned along a portion of radially inner surface 25 of nacelle 24 wherein the outer core cowl baffle is similar to inner core cowl baffle 102. In a further alternative embodiment, core cowl baffle assembly 100 includes a plurality of translating inner core cowl baffles 102 and/or a plurality of translating outer cowl baffles (not shown). In a further alternative embodiment, inner core cowl baffle 102 is a segmented member.

In the exemplary embodiment, inner core cowl baffle 102 has a first end 104, a second end 106, and a length $L_1$. In the exemplary embodiment, inner core cowl baffle 102 includes a radially outer surface 105. In the exemplary embodiment, first and second ends 104 and 106 may be tapered to prevent disruption of airflow 28 in fan nozzle duct 26 such that the airflow is laminar.

In the exemplary embodiment, second portion 21 of core cowl 22 surrounding the high-pressure turbine and the low-pressure turbine has a first diameter $D_1$, a second diameter $D_2$ measured at a position downstream from first diameter $D_1$, and a third diameter $D_3$ measured at a position downstream from second diameter $D_2$. In the exemplary embodiment, first diameter $D_1$ is less than second diameter $D_2$, and third diameter $D_3$ is substantially equal to first diameter $D_1$. Similarly, the radially inner surface of inner core cowl baffle 102 substantially conforms to the radially outer surface 15 of core cowl 22.

In the exemplary embodiment, inner core cowl baffle assembly 100 includes inner core cowl baffle 102 and an actuator assembly 110 to selectively position inner core cowl baffle 102 between first operational position 130 and second operational position 132 to vary the fan nozzle duct area (A18) and vary the amount of airflow flowing through fan nozzle duct 26. In the exemplary embodiment, at least one actuator assembly 110 is positioned within a portion of core cowl 22 and couples inner core cowl baffle 102 to core cowl 22. In an alternative embodiment, actuator assembly 110 may be coupled to any portion of core cowl 22. In an alternative embodiment, a plurality of actuator assemblies 110 are positioned within a portion of core cowl 22 and coupled to a portion of at least one inner core cowl baffle 102. Specifically, actuator assembly 110 selectively translates inner core cowl baffle 102 in a general axial direction toward or away from core cowl 22 to vary the fan nozzle duct area (A18). Actuator assembly 110 includes a plurality of circumferentially-spaced apart actuators or motors 112, and a plurality of extending rods 114, such as, but not limited to, ball screws. In the exemplary embodiment, each rod 114 is coupled to a respective motor 112 and to inner core cowl baffle 102 such that energizing motors 112 causes inner core cowl baffle 102 to be translated in either a forward direction 120 or an aft direction 122 depending on the energization of motors 112. In the exemplary embodiment, actuator assembly 110 may be, but is not limited to, electrically, pneumatically, or hydraulically powered to translate inner core cowl baffle 102 from first operational or stowed position 130 to second operational position 132 wherein inner core cowl baffle 102 is translated in forward direction 120 such that inner core cowl baffle 102 substantially reduces the amount of airflow 28 that is discharged from fan assembly 16 through fan nozzle duct 26.

During operation, a pilot/operator may selectively position inner core cowl baffle 102 in first or second operational position 130 and/or 132. For example, the operator may selectively position inner core cowl baffle 102 in first operational position (i.e. stowed position) 130 while the aircraft is operating in a cruise mode (i.e. during normal flight conditions). In first operational position 130, inner core cowl baffle 102 is fully retracted against core cowl 22 such that fan nozzle duct 26 has a first duct area 200 defined between radially inner surface 25 of nacelle 24 and radially outer surface 105 of inner core cowl baffle 102. When inner core cowl baffle 102 is positioned flush against core cowl 22 in first operational position 130, substantially all of the second portion 38 of airflow 28 discharged from fan assembly 16 is channeled through fan nozzle duct 26 and is discharged through first outlet 29. In both first and second operational positions 130 and 132, airflow flows along radially outer surface 105 of inner core cowl baffle 102.

When the aircraft is in off-design flight conditions (such as descent, landing, or other low thrust conditions), the pilot/operator may optionally select second operational position 132 by axially translating inner core cowl baffle 102 in forward direction 120 from first operational position 130 to reduce the fan duct area (A18) of fan nozzle duct 26. Specifically, in second operational position 132, inner core cowl baffle 102 is partially displaced from core cowl 22 such that fan nozzle duct 26 has a second duct area 202 defined between radially inner surface 25 of nacelle 24 and radially outer surface 105 of inner core cowl baffle 102. In the exemplary embodiment, second duct area 202 is less than first duct area 200 such that reducing the duct area from first duct area 200 to second duct area 202 reduces the amount of airflow 28 discharged through fan nozzle duct 26 and increases fan exit pressure which increases the efficiency of fan assembly 16. When inner core cowl baffle 102 is in second operational position (i.e. partially extended) 132, end 106 of inner core cowl baffle 102 remains in contact with core cowl 22, because first diameter $D_1$ is larger than second diameter $D_2$ of core cowl 22. Moreover, when inner core cowl baffle 102 is in second operational position 132, nacelle 24 operates at performance similar to the current production nacelles. The translating inner core cowl baffle described herein reduces the fan nozzle duct area up to approximately 30% to improve fan efficiency and therefore engine performance over other known engines having a fan nozzle duct with a fixed area.

Closing of the fan nozzle duct area during certain operating conditions, such as take-off or descent, can improve fuel burn by raising the fan operating line closer to the peak efficiency line. In addition, reduced noise is achieved as a result of reduced fan wake/outlet guide vane (OGV) interaction. Moreover, opening the fan nozzle during certain operating conditions, such as low altitude, can also reduce noise as a result of reduced jet velocity. Noise reduction benefit of varying the fan nozzle (VFN) can also be traded to further reduce fan diameter and corresponding fuel burn.

The method herein includes selectively positioning inner core cowl baffle 102 between first operational position 130 and second operational position 132 to vary the fan nozzle duct area (A18) and vary the amount of airflow 28 flowing through fan nozzle duct 26 and increase fan exit pressure.

Described herein is an axially translating inner core cowl baffle assembly that may be utilized on a wide variety of turbofan engine assemblies coupled to an aircraft. The inner core cowl baffle described herein improves engine performance during off-design flight conditions by reducing the fan nozzle duct area while simultaneously directing a substantial amount of air through the fan nozzle duct. This inner core cowl baffle assembly is a relatively low cost and low weight modification to increase engine efficiency.

An exemplary embodiment of an inner core cowl baffle assembly for a turbofan engine assembly is described above in detail. The inner core cowl baffle assembly illustrated is not limited to the specific embodiments described herein, but rather, components of each assembly may be utilized independently and separately from other components described herein.

While the invention has been described in terms of various specific embodiments, those skilled in the art will recognize that the invention can be practiced with modification within the spirit and scope of the claims.

What is claimed is:

1. A method for operating a turbofan engine assembly including a core gas turbine engine, a fan assembly coupled to the core gas turbine engine, a core cowl which circumscribes the core gas turbine engine, a nacelle positioned radially outward from the core cowl, a fan nozzle duct defined between the core cowl and the nacelle, and a core cowl baffle positioned within the fan nozzle duct, said method comprising:

varying an operating speed of the fan assembly from a first operating speed to a second operating speed; and selectively positioning the core cowl baffle in an upstream direction with respect to the core cowl from a stowed position during normal flight conditions to a low thrust position during off-design flight conditions to vary a throat area of the fan nozzle duct such that the throat area in the low thrust position is less than the throat area in the stowed position to facilitate improving engine efficiency at the second operating speed.

2. A method in accordance with claim 1 wherein selectively positioning the core cowl baffle further comprises positioning the core cowl baffle substantially flush against a portion of the core cowl to facilitate maximizing engine thrust.

3. A method in accordance with claim 1 wherein selectively positioning the core cowl baffle further comprises positioning the core cowl baffle a distance away from the core cowl to facilitate maximizing engine efficiency.

4. A method in accordance with claim 1 wherein selectively positioning the core cowl baffle further comprises positioning the core cowl baffle a distance away from the core cowl to facilitate maintaining fan efficiency.

5. A method in accordance with claim 1 wherein said method further comprises axially translating the core cowl baffle in a forward direction such that the fan nozzle duct throat area is reduced.

6. A method in accordance with claim 1 wherein the core cowl baffle comprises a radially outer surface, said method further comprising positioning the core cowl baffle in at least one of the first operational position and the second operational position to direct the airflow along the radially outer surface of the core cowl baffle.

7. A method in accordance with claim 1 wherein selectively positioning the core cowl baffle comprises actuating at least one of a plurality of circumferentially-spaced apart actuators of a core cowl baffle actuator assembly.

8. A method in accordance with claim 7 wherein actuating at least one of a plurality of circumferentially-spaced apart actuators comprises moving at least one of a plurality of extending rods coupled to a respective one of the plurality of actuators causing the core cowl baffle to be translated.

9. A method in accordance with claim 7 wherein actuating at least one of a plurality of circumferentially-spaced apart actuators comprises actuating at least one of a plurality of circumferentially-spaced apart actuators at least one of electrically, pneumatically, and hydraulically.

10. A method in accordance with claim 7 wherein selectively positioning the core cowl baffle comprises positioning the core cowl baffle between a first operational position, a second operational position, and a plurality of operational positions between the first and second operational positions.

* * * * *